Feb. 7, 1933. T. W. CASE 1,896,682
SOUND PICTURE APPARATUS
Original Filed July 24, 1926
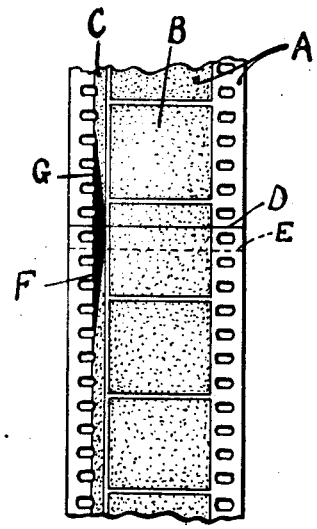
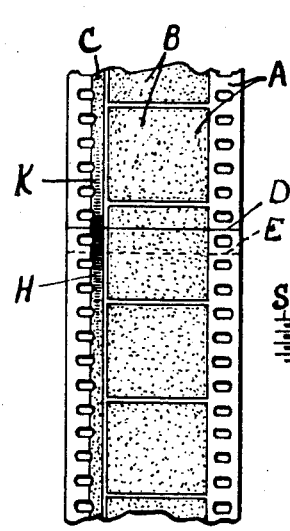
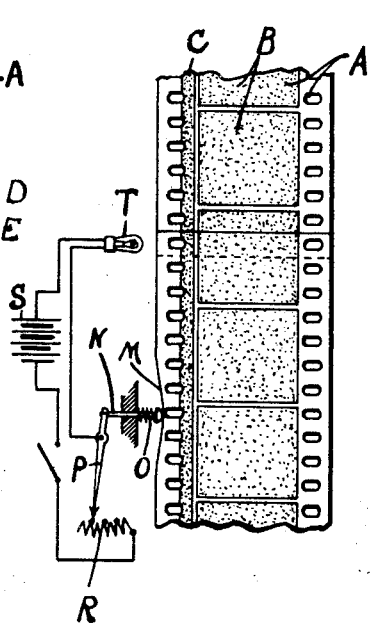
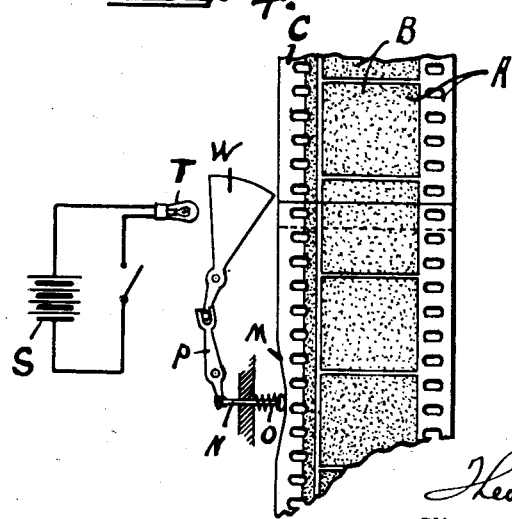
INVENTOR.
Theodore W. Case
BY
Ericson Thompson
ATTORNEYS.
WITNESS
H. W. Hurst.

Patented Feb. 7, 1933

1,896,682

UNITED STATES PATENT OFFICE

THEODORE WILLARD CASE, OF AUBURN, NEW YORK, ASSIGNOR TO CASE RESEARCH LABORATORY, INCORPORATED, OF AUBURN, NEW YORK, A CORPORATION OF NEW YORK

SOUND PICTURE APPARATUS

Application filed July 24, 1926, Serial No. 124,724. Renewed July 18, 1932.

This invention relates to certain improvements in sound picture apparatus.

In the production of moving picture films, it is customary to splice the film together at various points throughout its length to obtain the desired sequence of pictures, and for various other reasons, and when the sound record is produced along one edge of the picture, the splice which is not detrimental to the moving picture results in a disagreeable click in the sound picture, and the object of this invention is to eliminate the click or undesirable noise in the reproduction of sound from a sound picture on a spliced film.

Other objects and advantages relate to the details of the structure and the parts thereof, all as will more fully appear from the following description, taken in connection with the accompanying drawing, in which:

The four figures illustrate somewhat diagrammatically various embodiments of the invention.

In the figures the squares B in the center of the film A represent the moving picture portions of the film, and the narrow strip C at the left of the pictures B indicates the sound record portion of the film which has been spliced by overlapping the adjacent ends between the full line D and the dotted line E.

I have found that the undesirable click in spliced films as disclosed can be eliminated by gradually decreasing the light rays passing through the film from a point some distance forward of the splice up to the splice, and then gradually increasing the light rays passing through the film from the splice rearwardly of the film, i. e. gradually decreasing the light rays passing through the film from a normal condition of the sound record to a condition where no rays pass through the film at the spliced portion between the lines D and E and then gradually increasing the rays passing through the film from the line D rearwardly of the film to a point where the film again assumes its normal sound record condition.

In Figure 1 this decrease and increase of the passage of light rays through the film is effected by rendering a tapered portion of the film adjacent the splice and forward of the dotted line E opaque, i. e. beginning at the line D, the entire width of the sound record is rendered opaque and a line bordering the opaque portion forward of the line E extends from one side of the film record diagonally across the record to the opposite edge, thereby producing an opaque strip of tapered form gradually increasing in width up to the splice, at which point it substantially equals the width of the sound record.

The entire portion of the sound record between the lines D and E is rendered opaque and rearwardly of the line D a corresponding gradual increase of the light rays passing through the film is effected by rendering a tapered portion of the sound record opaque, the opaque portion at the line D substantially equaling the width of the sound record, and being bounded by a line extending from the inner edge of the sound record diagonally to the outer edge thereof.

In this manner, two similar tapered opaque portions F and G are formed leading to and from the splice, whereby the passage of light rays through the film is gradually decreased and increased, to thereby eliminate any sudden change which results in the undesirable click described.

The two tapered opaque portions F and G may be produced in any suitable way, as perhaps by covering the film with a suitable opaque material, as for instance paint.

In Figure 2 substantially the same result is accomplished in a somewhat different manner in that the entire width of the sound record is gradually made less transparent from a point forward of the splice up to the splice, at which point the record is rendered opaque and then rearwardly of the splice the entire width of the sound record from a condition of opacity is gradually rendered less opaque to a point at which the sound record portion of the film remains in its normal condition, thereby forming two portions upon opposite sides of the splice, the one forward of the splice gradually increasing in opacity or decreasing in transparency from the normal condition of the sound record to an opaque condition at the splice, and then rearwardly of the splice gradually increasing in transparency from a condition of opacity to the normal condition of the sound record.

The treated portion of the sound record forward of the splice is indicated by the letter H and the treated portion of the sound record rearwardly of the splice is indicated by the letter K. Any suitable means for effecting this increase and decrease in transparency may be utilized, as for instance by coloring the film.

In Figure 3 a further structure for effecting the same result is illustrated in that the source of the light rays, passing through the sound record, is automatically and gradually varied so that the light rays passing through the film are gradually decreased forwardly of the splice and gradually increased rearwardly of the splice by controlling the source of said rays.

This may be accomplished in any suitable manner, as for instance by forming the edge of the film with a recess or concavity M, which gradually increases in depth to a maximum and then gradually decreases in depth until it again intersects the edge of the film. This recess is properly positioned and utilized in connection with the bar N which has its inner end in contact with the edge of the film, and is spring-pressed inwardly as by spring O. This bar N is connected to one end of a lever P, the opposite end of which operates as one of the contacts of a rheostat R included in the circuit containing the source of potential S which lights the lamp T. The arm N moves inwardly under the action of spring O when the recess M in the edge of the film moves by the end of the arm and in this manner the rheostat R is automatically controlled so as to gradually decrease and gradually increase the current flowing in the lighting circuit for the lamp and the condition can be readily adjusted so that the lamp will be unlighted or practically unlighted at the splice, this condition being reached by a gradual variation in the rays emanating from the lamp to thereby eliminate the click ordinarily produced by the passage of a splice in the sound record.

In Figure 4 a structure somewhat similar to Figure 3 is disclosed except that the recess or notch in the edge of the film and which actuates the bar N is utilized for controlling a shutter W of any suitable and well known form, to thereby control the passage of light from the source T to the sound record. The recess M in the film is of such form so that in cooperation with the arm N the passage of light to the film may be varied gradually from normal intensity to a condition at which no light passes. Obviously the range of such adjustment may be predetermined within any desired limits.

It will be apparent that the groove or recess M in the edge of the film may be utilized to control the volume of amplification as well as to control light volume. In other words, the volume of amplification can be increased or decreased gradually by the use of the recess M. Further, such a recess may be used for controlling amplification, light, etc. on parts of the film where no sound is desired. For instance, if there is to be no sound on the record for the first fifteen feet or any predetermined number of feet, the structures here disclosed provide a means for keeping this part of the film absolutely quiet by decreasing the light waves gradually in any of the above ways described from the beginning of the film and increasing gradually the passage of light rays up to the point where the sound record is to start.

The description of this application has been made in connection with a negative actually provided with a splice but when the negative is printed on the positive that will not result in an actual splice on the positive, but rather an image of the negative splice, and for the purpose of this application and the claims thereof, the positive image of the splice is deemed the equivalent of the negative splice.

Altho I have shown and described several structures and methods of accomplishing the objects of this invention, I do not desire to limit myself to the details of the structure or the methods herein described, or to the structures or methods themselves, as various changes and modifications may be made within the scope of this invention.

I claim:

1. The combination with a sound picture film, of means for transmitting light rays through the sound record portion thereof, means actuated by said film for gradually decreasing the intensity of light passing through a portion of said sound record, and for gradually increasing the intensity of light passing through another portion of said sound record.

2. The combination with a sound picture film, of means for transmitting light rays through the sound record portion thereof, means actuated by said film for gradually decreasing the intensity of light passing through the sound record forwardly of an undesired portion thereof, and for gradually increasing the intensity of light passing through the sound record rearwardly of an undesired portion thereof.

3. The combination with a sound picture film, of means for transmitting light rays through the sound record portion thereof, means actuated by said film for gradually decreasing the quantity of light passing through a portion of said sound record, and for increasing the quantity of light passing through another portion of said sound record.

4. The combination with a sound picture film, of means for transmitting light rays through the sound record portion thereof, means actuated by said film for gradually decreasing the quantity of light passing through the sound record forwardly of an undesired portion thereof, and for gradually increasing the quantity of light passing through the sound record rearwardly of an undesired portion thereof.

5. A film having a sound record thereon, a source of light to which said sound record is exposed, a movable shutter actuated by the film for gradually varying the degree of exposure of a selected portion of said sound record to said source of light, said exposure varying gradually from normal at the beginning of said portion to substantially no exposure at the end of said portion.

6. A film having a sound record thereon, a source of light to which said sound record is exposed, a circuit for said lamp and including a source of potential and a resistance, and means actuated by the film for varying the value of the resistance in said circuit for gradually varying the degree of exposure of a selected portion of said sound record to said source of light, said exposure varying gradually from substantially no exposure at the beginning of said portion to normal exposure at the end of said portion.

7. A film having a sound record thereon, a source of light to which said sound record is exposed, means extraneous to and actuated by said film for gradually varying the degree of exposure of a selected portion of said sound record to said source of light, said exposure varying gradually from normal at the beginning of said portion to substantially no exposure at the end of said portion.

8. A film having a sound record thereon, a source of light to which said sound record is exposed, means extraneous to and actuated by said film for gradually varying the degree of exposure of a selected portion of said sound record to said source of light, said exposure varying gradually from substantially no exposure at the beginning of said portion to normal exposure at the end of said portion.

9. A film having a sound record thereon, a source of light to which said sound record is exposed, a shutter movable between the source of light and the film, means for actuating the shutter for gradually varying the degree of exposure of a selected portion of said sound record to said source of light, said exposure varying gradually throughout said portion from normal exposure at the beginning to substantially no exposure at the central portion and back to normal exposure at the end.

10. A film having a sound record thereon, a source of light to which said sound record is exposed, means extraneous to and actuated by said film for gradually varying the degree of exposure of a selected portion of said sound record to said source of light, said exposure varying gradually throughout said portion from normal exposure at the beginning to substantially no exposure at the central portion and back to normal exposure at the end.

11. A film having a sound track thereon adapted to receive a sound record, a source of light to which said sound track is exposed, means extraneous to and actuated by said film for gradually varying the degree of exposure of a selected portion of said sound track to said source of light, said exposure varying gradually from normal at the beginning of said portion to substantially no exposure at the end of said portion.

12. A film having a sound track thereon adapted to receive a sound record, a source of light to which said sound track is exposed, means extraneous to and actuated by said film for gradually varying the degree of exposure of a selected portion of said sound track to said source of light, said exposure varying gradually from substantially no exposure at the beginning of said portion to normal exposure at the end of said portion.

In witness whereof I have hereunto set my hand this 17th day of July, 1926.

THEODORE WILLARD CASE.